US008493640B2

(12) United States Patent
Tamehira et al.

(10) Patent No.: US 8,493,640 B2
(45) Date of Patent: Jul. 23, 2013

(54) IMAGE READER AND IMAGE FORMING APPARATUS

(75) Inventors: Masato Tamehira, Osaka (JP); Sohichi Takata, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 173 days.

(21) Appl. No.: 13/196,973

(22) Filed: Aug. 3, 2011

(65) Prior Publication Data

US 2012/0033270 A1 Feb. 9, 2012

(30) Foreign Application Priority Data

Aug. 4, 2010 (JP) ................................. 2010-175132

(51) Int. Cl.
*H04N 1/04* (2006.01)
(52) U.S. Cl.
USPC ............................. 358/498; 358/474; 358/496
(58) Field of Classification Search
USPC ................................................ 358/498, 475
See application file for complete search history.

(56) References Cited

U.S. PATENT DOCUMENTS

| 7,667,877 B2 * | 2/2010 | Morimoto ...................... 358/474 |
| 2011/0176188 A1 * | 7/2011 | Tamehira et al. ............. 358/498 |
| 2012/0008155 A1 * | 1/2012 | Nakanishi et al. ............. 358/1.9 |
| 2012/0026562 A1 * | 2/2012 | Yoshimoto et al. ........... 358/498 |

FOREIGN PATENT DOCUMENTS

| JP | 9-304844 A | 11/1997 |
| JP | 2000-180994 A | 6/2000 |
| JP | 2002-354191 A | 12/2002 |
| JP | 2002354191 A * | 12/2002 |
| JP | 2005-96951 A | 4/2005 |
| JP | 2007-201888 A | 8/2007 |
| JP | 2008-258872 A | 10/2008 |
| JP | 2009-267921 A | 11/2009 |

* cited by examiner

*Primary Examiner* — Tammy Pham
*Assistant Examiner* — Richa Mishra
(74) *Attorney, Agent, or Firm* — Birch, Stewart, Kolasch & Birch, LLP

(57) ABSTRACT

An image reader includes: a read frame; a read guide; and a seal mechanism. The seal mechanism covers a gap between the read frame and the read guide. The seal mechanism includes a rib standing in parallel with a sliding direction of the read guide and a flexible dustproof sheet having an end that is in contact with the rib.

7 Claims, 9 Drawing Sheets

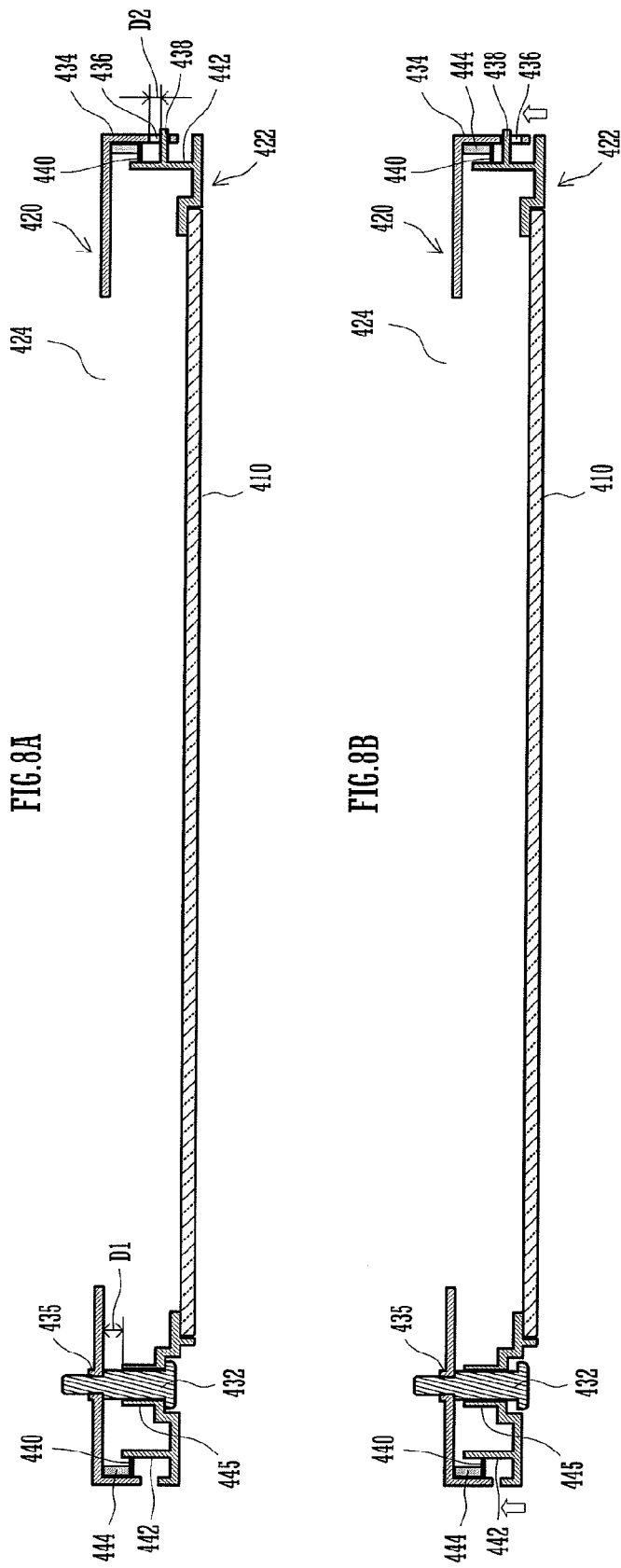

IMAGE READER AND IMAGE FORMING APPARATUS

CROSS REFERENCE

This Nonprovisional application claims priority under 35 U.S.C. §119(a) on Patent Application No. 2010-175132 filed in Japan on Aug. 4, 2010, the entire contents of which are hereby incorporated by reference.

BACKGROUND OF THE INVENTION

The present invention relates to an image reader including a read guide unit disposed on both sides of a document conveyance path, the read guide unit having an adjustable space in accordance with a thickness of a document conveyed, and relates to an image forming apparatus including such an image reader.

At a document reading position for reading a document conveyed is disposed a contact glass configured to come into contact with the document and to guide the conveyance of the document. In general, this contact glass is supported stably by a housing that accommodates an optical system therein.

In such a configuration, there is a case of dust entering the housing through a gap between the contact glass and a glass supporting portion of the housing and the dust adhering to the optical system in the housing. Such dust adhering to the optical system unfortunately may appear as black streak in a read image.

To avoid this, some conventional techniques propose a reader including a flexible dustproof member intervening between the lower face of a contact glass and a supporting portion of the contact glass and a restricting part provided at a part of a sheet guide unit to prevent the floating of the contact glass by a pressing force of the flexible member to the contact glass (see JP 2000-180994 A, for example).

Even with such a configuration in the conventional technique, in the case of an image reader provided with a read guide unit with an adjustable space in accordance with the thickness of a document conveyed, there is a case of dust entering inside a housing through a mechanism to move the read guide unit.

Such a mechanism adjusting the space in accordance with the thickness of a document conveyed is important for keeping good reading accuracy for both fixed ordinary paper and cards, but has a problem of often generating a gap in the housing corresponding to a moving stroke of the mechanism.

For dustproofing, the housing has to have an improved sealing property. A mechanism for such an improved sealing property, however, may hinder the smooth movement of members making up the housing, which may cause problems such as a failure in adjusting the space of a read guide unit appropriately or a document being caught at the read guide unit and fed in a slanting direction.

It is an object of the present invention to provide an image reader and an image forming apparatus capable of achieving an improved sealing property of a housing member to accommodate an optical system therein without impairing a space-adjusting function of a read guide with an adjustable space in accordance with the thickness of a document conveyed.

SUMMARY OF THE INVENTION

An image reader of the present invention includes a read guide disposed on both sides of a document conveyance path, the read guide having a space that is adjustable in accordance with a thickness of a document conveyed. The image reader includes: a read frame member; a read guide member; and a seal mechanism.

The read frame member is fixed to a document reading unit, and supports an optical system.

The read guide member makes up a housing member together with the read frame member to accommodate the optical system therein. The read guide member is configured to guide a document to be conveyed to a reading position and support a read glass. The read guide member is supported slidably with respect to the read frame member.

The seal mechanism covers a gap between the read frame member and the read guide member. The seal mechanism includes a rib standing in parallel with a vertical moving direction of the read guide member and a flexible dustproof sheet having an end that is in contact with the rib. Examples of the dustproof sheet include a urethane sheet of about 0.1 mm in thickness.

In this configuration, the rib disposed at one of the read frame member and the read guide member is in contact with the dustproof sheet disposed at the other, whereby a gap between the read frame member and the read guide member is covered.

The rib is provided in parallel with the vertical moving direction of the read guide member, and the end of the flexible dustproof sheet is in contact with the rib, thus sealing the housing member. This configuration enables the sliding operation of the read guide member with less interruption by friction between the dustproof sheet and the rib. As a result, a sealing property of the housing member made up of the read frame member and the read guide member can be improved without inhibiting the smooth sliding operation of the read guide member.

According to the present invention, a sealing property of a housing member to accommodate an optical system therein can be improved without impairing a space-adjusting function of a read guide with an adjustable space in accordance with the thickness of a document conveyed.

BRIEF DESCRIPTION OF THE DRAWINGS

FIG. 8A and FIG. 8B illustrate a movable range of a read guide of the second read guide unit.

DETAILED DESCRIPTION OF THE INVENTION

Figure 1:
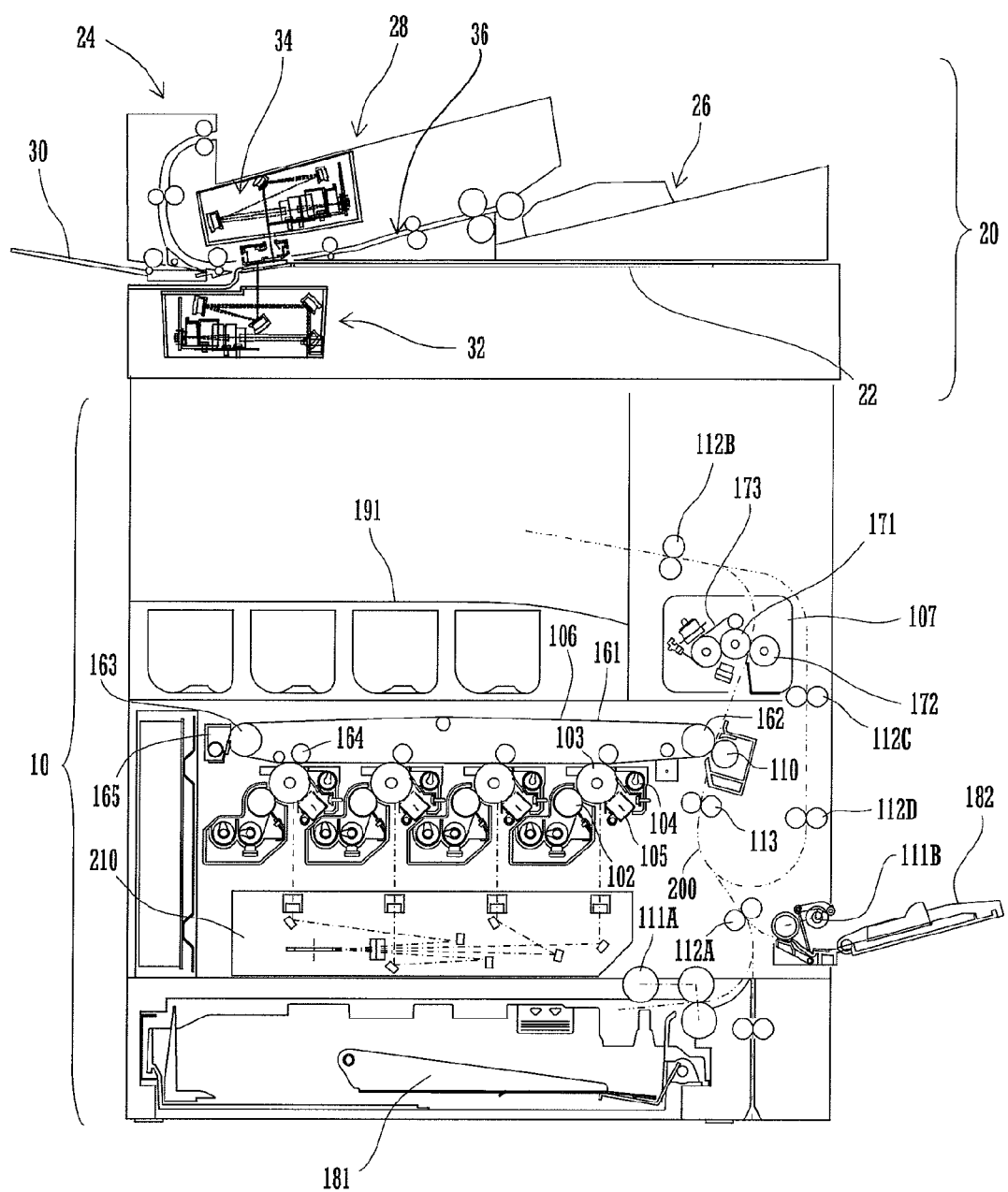
FIG. 1 is a cross-sectional view illustrating a schematic configuration of an image forming apparatus according to one embodiment of the present invention.

FIG. 1 is a schematic cross-sectional view of an image forming apparatus 100 according to one embodiment of the present invention. The image forming apparatus 100 forms a multicolored or single-colored image on a predetermined sheet (recording sheet) in accordance with image data externally transmitted, and includes a document reading section 20 and an image forming section 10.

The document reading section 20 is configured capable of simultaneously reading images on both faces of a document conveyed. The document reading section 20 includes a document platen 22 made of transparent glass on which a document is manually placed, and above the document platen 22 is installed an automatic document processor 24. The automatic document processor 24 is configured to sequentially convey a document on a paper feeding tray 26 via a document conveyance path 36 to a first document output unit 28 to output a document of ordinary paper or to a second document output unit 30 to output a thick document (cards, envelopes or the like).

On both sides of the document conveyance path 36 are provided a first reading unit 32 configured to read an image on a first face of a document conveyed or an image of a document on the document platen 22 and a second reading unit 34 configured to read an image on a second face of a document conveyed. In this example, the first reading unit 32 and the second reading unit 34 each include an optical reduction system using a CCD, which may be a CIS. The detailed configuration of the document reading section 20 will be described later.

Below the document reading section 20 is disposed the image forming section 10. The image forming section 10 includes an optical scanner 210, a development unit 102, a photoreceptor drum 103, a cleaner unit 104, a charger 105, an intermediate transfer belt unit 106, a fixing unit 107, a paper feeding cassette 181, a copy receiving unit 191 and the like.

Image data processed by this image forming apparatus 100 corresponds to a color image including colors of black (K), cyan (C), magenta (M) and yellow (Y). Accordingly, four sets of the development unit 102, the photoreceptor drum 103, the charger 105 and the cleaner unit 104 are provided to form four types of latent images corresponding to the respective colors including black, cyan, magenta and yellow, thus configuring four image stations.

The charger 105 is means to uniformly charge the surface of the photoreceptor drum 103 at a predetermined electrical potential, which may be a contact type charger such as a roller or a brush instead of a non-contact type charger as illustrated in FIG. 1.

The optical scanner 210 is configured to form an electrostatic latent image on the surface of each photoreceptor drum 103 in accordance with image data input.

Each development unit 102 makes the electrostatic latent image formed on the corresponding photoreceptor drum 103 visible with toner in one of the four colors (YMCK). Each cleaner unit 104 removes and collects toner remaining on the surface of the corresponding photoreceptor drum 103 after development and image transferring steps.

The intermediate transfer belt unit 106 disposed above the photoreceptor drums 103 includes an intermediate transfer belt 161, an intermediate transfer belt driving roller 162, an intermediate transfer belt idle roller 163, intermediate transfer rollers 164, and an intermediate transfer belt cleaning unit 165. Four intermediate transfer rollers 164 are provided corresponding to the respective colors of YMCK.

The intermediate transfer belt driving roller 162, the intermediate transfer belt idle roller 163 and the intermediate transfer rollers 164 are configured to stretch the intermediate transfer belt 161 therebetween for rotation driving. Each intermediate transfer roller 164 applies a transfer bias to transfer a toner image on the photoreceptor drum 103 to the intermediate transfer belt 161.

The intermediate transfer belt 161 is provided to come into contact with each photoreceptor drum 103. The intermediate transfer belt 161 has a function to allow a toner image in each color formed on the photoreceptor drum 103 to be transferred and sequentially overlaid thereon, so that a color toner image (multicolored toner image) is formed on the intermediate transfer belt 161. The intermediate transfer belt 161 is formed as an endless belt using film of 100 μm to 150 μm in thickness, for example.

Toner images are transferred from the photoreceptor drums 103 to the intermediate transfer belt 161 by the intermediate transfer rollers 164 in contact with the rear side of the intermediate transfer belt 161. A transfer bias of a high voltage (high voltage with reversed polarity (+) of the polarity (−) of charged toner) is applied to the intermediate transfer rollers 164 for transferring of the toner images. Each of the intermediate transfer rollers 164 is a roller including a metal (e.g., stainless steel) shaft of 8 to 10 mm in diameter as a base that is surrounded by a conductive elastic material (e.g., EPDM or urethane foam). This conductive elastic material enables the uniform application of a high voltage to the intermediate transfer belt 161. The present embodiment uses the transfer electrodes in a roller shape, but not limited to, and a brush type transfer electrode may be used, for example.

As stated above, the electrostatic image is made visible on each photoreceptor drum 103 in the corresponding color, and is overlaid on the intermediate transfer belt 161. Then, as the intermediate transfer belt 161 rotates, the thus overlaid image information is transferred onto a sheet by a transfer roller 110 described below that is disposed at a contact position of the sheet and the intermediate transfer belt 161.

At this time, the intermediate transfer belt 161 and the transfer roller 110 are brought into contact with each other under pressure with a predetermined nip, while a voltage (high voltage with reversed polarity (+) of the polarity (−) of charged toner) is applied to the transfer roller 110 for transferring of the toner onto a sheet. In order to allow the transfer roller 110 to give the above-stated nip steadily, any one of the transfer roller 110 and the intermediate transfer belt driving roller 162 may be made of a hard material (e.g., metal), and the other may be an elastic roller made of a soft material (e.g., elastic rubber roller or foaming resin roller).

As stated above, toner adheres to the intermediate transfer belt 161 in contact with the photoreceptor drums 103 or toner may remain on the intermediate transfer belt 161 without being transferred to a sheet by the transfer roller 110, and such toner causes the mixture of colors of toner at a following step. In order to avoid this, the intermediate transfer belt cleaning unit 165 is provided to remove and collect such toner. The intermediate transfer belt cleaning unit 165 includes a cleaning blade, for example, as cleaning member coming into contact with the intermediate transfer belt 161. At a portion of the intermediate transfer belt 161 brought into contact with the cleaning blade, the intermediate transfer belt 161 is supported by the intermediate transfer belt idle roller 163 from the opposite side.

The paper feeding cassette 181 is a tray for storing sheets (recording sheets) used for image formation, and is disposed below the optical scanner 210 of the image forming section 10. The sheets used for image formation may be placed on a manual paper feeding cassette 182 as well. The copy receiving unit 191 provided at an upper portion of the image forming section 10 is a tray for piling up sheets subjected to printing while letting the printed side face downward.

The image forming section 10 is further provided with a substantially vertical sheet conveyance path 200 to send a sheet from the paper feeding cassette 181 or the manual paper feeding cassette 182 to the copy receiving unit 191 via the transfer roller 110 and the fixing unit 107. In the vicinity of the sheet conveyance path 200 from the paper feeding cassette 181 or the manual paper feeding cassette 182 to the copy receiving unit 191 are disposed pickup rollers 111A and 111B, a plurality of conveyance rollers 112A to 112D, paper stop rollers 113, the transfer roller 110 and the fixing unit 107, for example.

The conveyance rollers 112A to 112D are small rollers to promote and assist the conveyance of a sheet, and a plurality of these rollers are provided along the sheet conveyance path 200. The pickup roller 111A is provided in the vicinity of an end of the paper feeding cassette 181 so as to pick up sheets one by one from the paper feeding cassette 181 and supply the sheet to the sheet conveyance path 200. Similarly, the pickup roller 111B is provided in the vicinity of an end of the manual paper feeding cassette 182 so as to pick up sheets one by one from the manual paper feeding cassette 182 and supply the sheet to the sheet conveyance path 200.

The paper stop rollers 113 hold a sheet being conveyed along the sheet conveyance path 200 once. Then, the paper stop rollers 113 function to convey the sheet to the transfer roller 110 at timing when a front end of a toner image on the photoreceptor drum 103 and a front end of the sheet are aligned.

The fixing unit 107 includes a heat roller 171 and a pressure roller 172, and the heat roller 171 and the pressure roller 172 rotate while sandwiching a sheet therebetween. The heat roller 171 is set at a predetermined fixing temperature by a controller on the basis of a signal from a temperature detector not illustrated. The heat roller 171 as well as the pressure roller 172 have a function to heat and pressurize toner with respect to a sheet to melt, mix and pressurize a multicolored toner image transferred on the sheet for heat fixing. An external heating belt 173 is further provided to heat the heat roller 171 externally.

The following describes the sheet conveyance path in detail. As stated above, the image forming apparatus is provided with the paper feeding cassette 181 for storing sheets beforehand and the manual paper feeding cassette 182. In order to feed a sheet from these paper feeding cassettes 181 and 182, the pickup rollers 111A and 111B are provided, respectively, so as to guide sheets one by one to the conveyance path 200.

A sheet is conveyed from the paper feeding cassette 181 or the manual paper feeding cassette 182 to the paper stop rollers 113 by the conveyance rollers 112A in the sheet conveyance path 200. Then, the sheet is conveyed to the transfer roller 110 at timing when a front end of the sheet is aligned with a front end of image information on the intermediate transfer belt 161, and the image information is written on the sheet. Thereafter, the sheet passes through the fixing unit 107 so that unfixed toner is melt by heat and fixed for adhesion to the sheet, and the sheet is discharged via the conveyance rollers 112B provided downstream to the copy receiving unit 191.

The above-stated conveyance path is for processing a single-sided printing request to a sheet. On the other hand, in the case of a double-sided printing request, a sheet subjected to single-sided printing and passing through the fixing unit 107 as stated above is held at its rear end by the finally disposed conveyance rollers 112B. Then, the conveyance rollers 112B rotate reversely so as to guide the sheet to the conveyance rollers 112C and 112D. Thereafter the sheet passes through the paper stop rollers 113 and is subjected to printing on the rear face of the sheet. The sheet is then discharged to the copy receiving unit 191.

Figure 2:
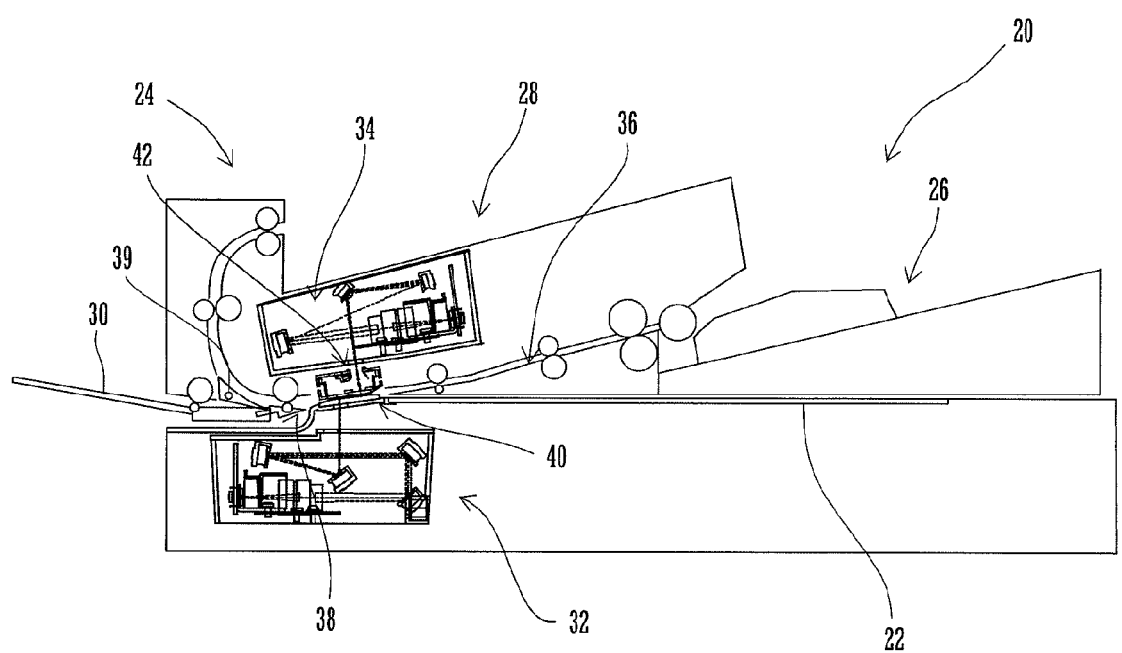
FIG. 2 is a cross-sectional view illustrating a schematic configuration of a document reading section.

Referring now to FIG. 2, the following describes the configuration of the document reading section 20. As illustrated in this drawing, the document conveyance path 36 is linearly inclined downward from the paper feeding tray 26 to a document guide 38 (in this drawing, inclined downward from right to left). Herein, the document guide 38 is supported swingably. Downstream of the document guide 38 is provided a path changing member 39 configured to guide a document conveyed either to the first document output unit 28 or to the second document output unit 30. In this embodiment, the path changing member 39 is configured to guide a thick document such as a card (e.g., with a thickness of 0.6 mm or more) to the second document output unit 30 and to guide a document other than thick documents (e.g., with a thickness less than 0.6 mm) to the first document output unit 28. A document guided by the path changing member 39 to the first document output unit 28 passes through a portion having a U-letter shape in cross section of the document conveyance path 36 and then is conveyed to the first document output unit 28.

Upstream of the document guide 38 in the document conveyance path 36 are provided a first read guide unit 40 and a second read guide unit 42 that are inclined substantially in parallel with the document conveyance path 36. The first read guide unit 40 and the second read guide unit 42 are disposed to sandwich the document conveyance path 36 therebetween and are configured to achieve stable conveyance of a document to be read by the first reading unit 32 and the second reading unit 34.

Figure 3:
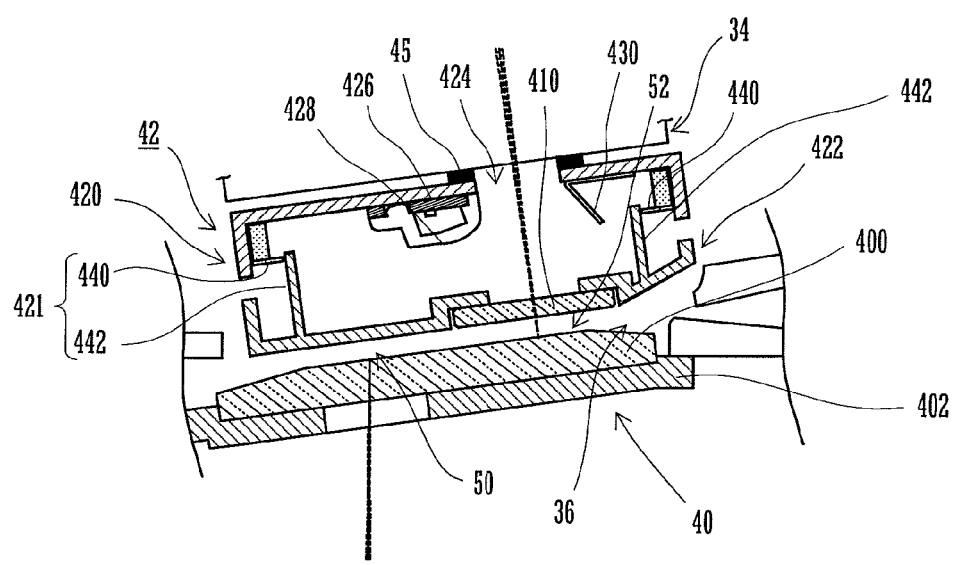
FIG. 3 is a cross-sectional view schematically illustrating the configuration in the vicinity of a first read guide unit and a second read guide unit of the document reading section.

Referring next to FIG. 3, the configuration in the vicinity of the first read guide unit 40 and the second read guide unit 42 is described below. The first read guide unit 40 and the second read guide unit 42 are configured to guide a document so that an image on the document is read at a first reading position 50 or a second reading position 52. The first read guide unit 40 and the second read guide unit 42 are opposed to each other while sandwiching the document conveyance path 36 therebetween, and have a space therebetween adjustable in accordance with a thickness of a document conveyed. In this embodiment, the space between the first read guide unit 40 and the second read guide unit 42 is adjustable in a range, but not limited to, from about 0.6 mm to 1.3 mm.

The first read guide unit 40 includes a first guide member 400 made up of a transparent plate member such as glass facing a first face of a document and a guide supporting member 402 supporting the first guide member 400.

A second read guide unit 42 includes a read frame 420 fixed to a frame in the document reading section 20 and a read guide 422 suspending from the read frame 420 to be movable up and down (i.e., movable vertically). The read frame 420 together with the read guide 422 make up a housing member to accommodate an optical system therein. The read frame 420 includes an open face on one side, and this open face is blocked by the read guide 422. The read frame 420 has an opening 424 letting light pass therethrough, and all around the opening 424 is provided a moltplane 45. This moltplane 45 is in intimate contact with the second reading unit 34 so as to prevent the leakage of light through the opening 424. The read guide 422 includes a transparent plate member 410 such as glass facing a second face of a document. A light beam for document reading emitted from the second reading unit 34 passes through the opening 424 and the plate member 410 and is applied to the second face of a document.

Referring next to FIGS. 4 to 8, the configuration of the second read guide unit 42 is described below. The read frame 420 is provided with an optical system including a LED board 426 with a LED mounted thereon, a light guiding plate 428 disposed around the LED board 426, a reflector 430 that reflects light toward a document reading position and the like.

Figure 4:
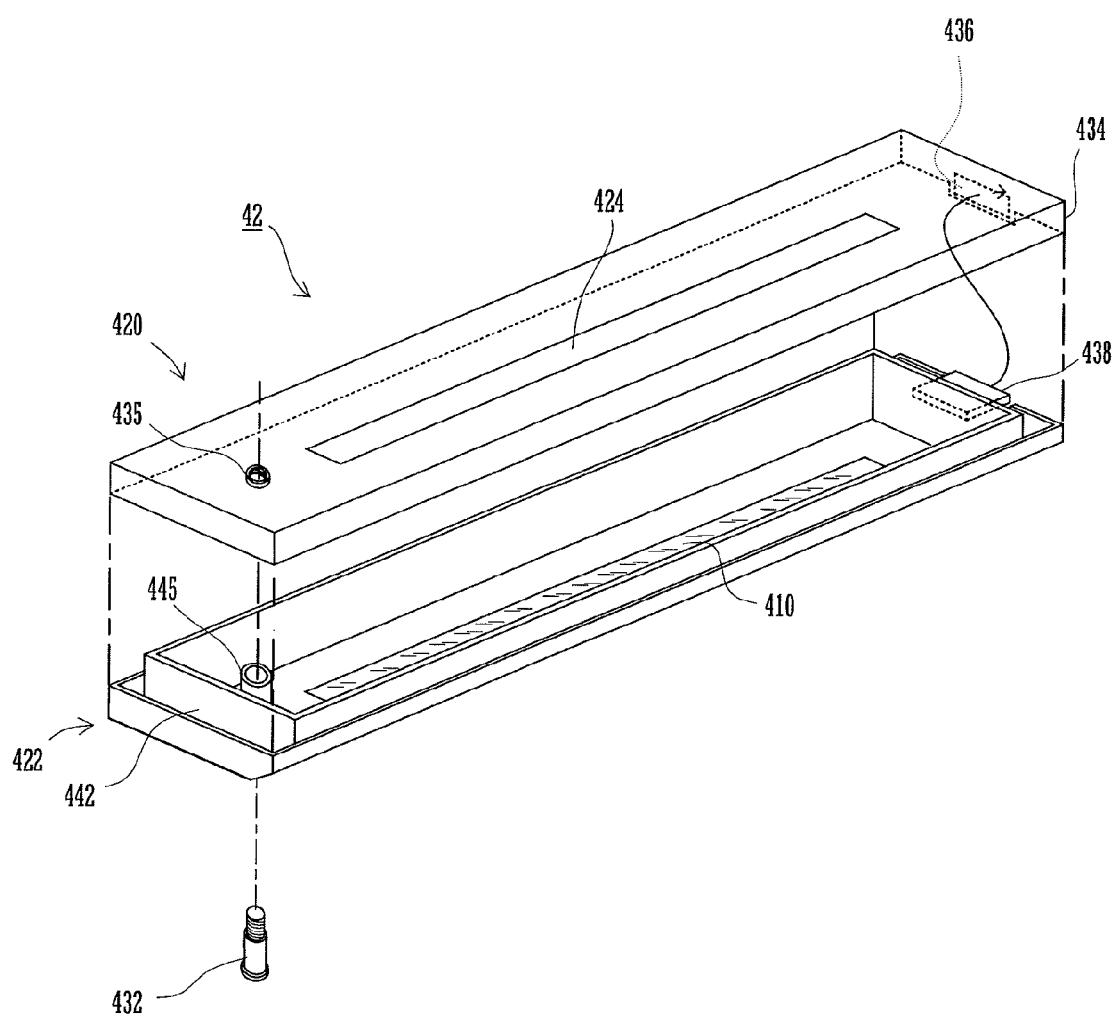
FIG. 4 is an assembly drawing schematically illustrating the configuration of the second read guide unit.
Figure 5:
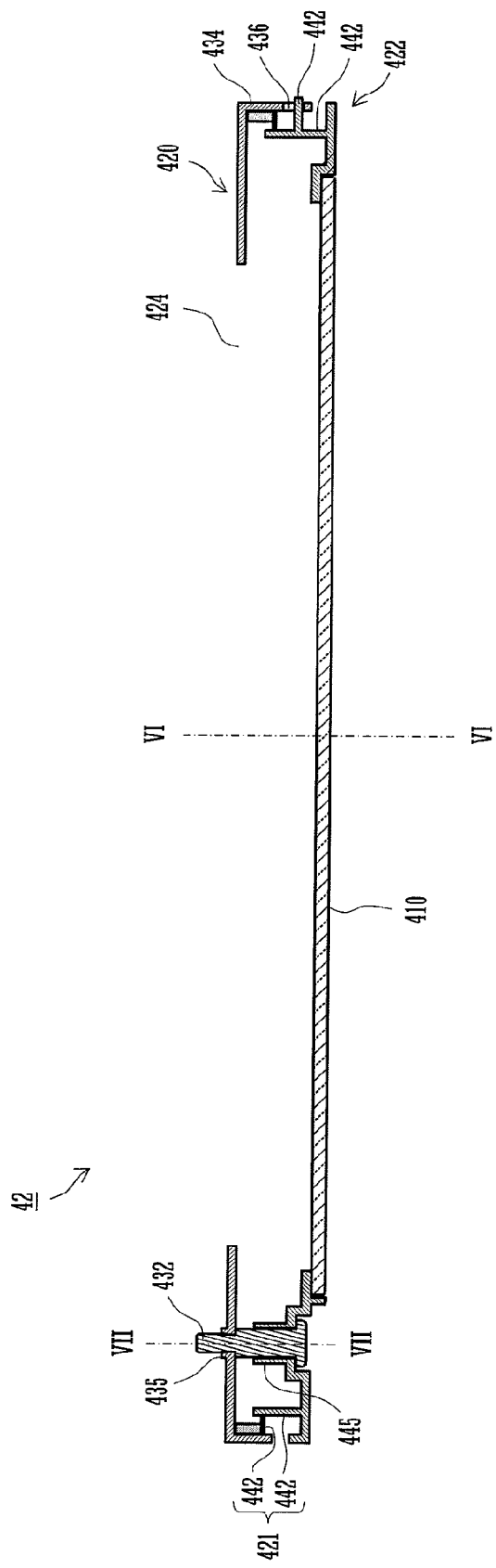
FIG. 5 is a cross-sectional view schematically illustrating the configuration of the second read guide unit along the length direction.
Figure 6:
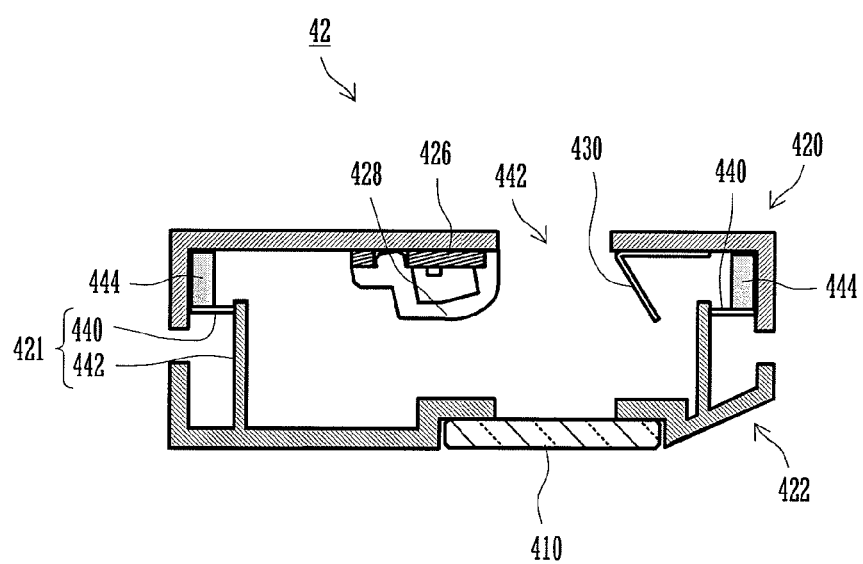
FIG. 6 is a cross-sectional view taken along VI-VI of FIG. 5.
Figure 7:
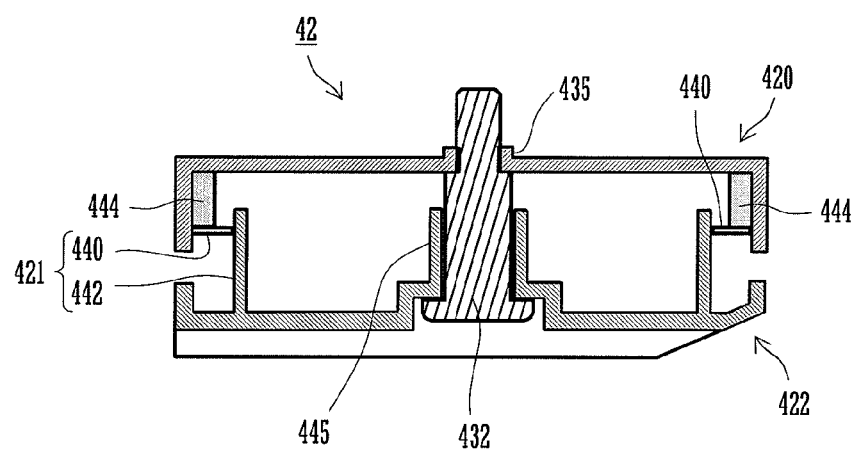
FIG. 7 is a cross-sectional view taken along VII-VII of FIG. 5.

The read guide 422 is supported at one end portion in the length direction (direction orthogonal to the document conveyance direction) by the read frame 420 via a shoulder screw 432. As illustrated in FIG. 4, the shoulder screw 432 is inserted from below the second read guide unit 42 to a boss 445 provided in a protruding manner at a bottom face of the read guide 422, and is screwed with a screw hole 435 penetrating through a top face of the read frame 420. The other end portion of the read guide 422 is supported by engagement between an engagement hole 436 formed in a side wall 434 of the read frame 420 and an engagement piece 438 provided at the read guide 422.

As illustrated in FIG. 8, a sufficient space D1 is formed between the upper end of the boss 445 and the top face of the read frame 420. As illustrated in FIG. 8, a sufficient space D2 is formed between the upper face of the engagement piece 438 and the upper edge of the engagement hole 436. The spaces D1 and D2 may have the same size or either one may have a larger size. When the spaces D1 and D2 have the same size, the vertical movable range of the read guide 422 is decided by their size. When the spaces D1 and D2 have different sizes, the vertical movable range of the read guide 422 is decided by a smaller size. The read guide 422 is supported at the lowest position of the vertical movable range by its own weight, and when a thick document passing gives a lifting force thereto, the read guide 422 can move upward to the highest position of the vertical movable range at maximum as described later.

In this configuration, although the shoulder screw 432 is provided only at one end portion in the length direction of the read guide 422, both end portions may be supported using the shoulder screws 432. Considering the workability for attachment and detachment of the read glide 422, however, the shoulder screw 432 is preferably provided at only one end portion in the length direction of the read guide 422.

The read frame 420 and the read guide 422 are sealed by a seal mechanism 421 so as to prevent dust from entering inside the read frame 420 and the read guide 422.

The seal mechanism 421 includes a rib 442 formed along the entire perimeter of the read guide 422 and a thin and flexible dustproof sheet 440 disposed along the entire perimeter of the read frame 420. The rib 442 stands vertically from the face of the read guide 422 facing the read frame 420. That is, the rib 442 is provided in parallel with the vertical moving direction of the read guide 422.

The dustproof sheet 440 is made of a urethane sheet of about 0.1 mm in thickness, and is disposed so that an end of the dustproof sheet 440 is brought into contact with the rib 442. In this embodiment, as the dustproof sheet 440, a urethane sheet produced by Nihon Matai Co., Ltd. "Matai URS surface matte type" is used. The dustproof sheet 440 is attached to the read frame 420 via a sheet attachment member 444 made of urethane foam. In this way, the dustproof sheet 440 is attached via the sheet attachment member 444 made of the same material, whereby the effect of preventing the rippling of the sheet can be obtained due to uniform linear expansion. In this example, the dustproof sheet 440 is attached, but not limited to, using double-faced tape.

Figure 9A:
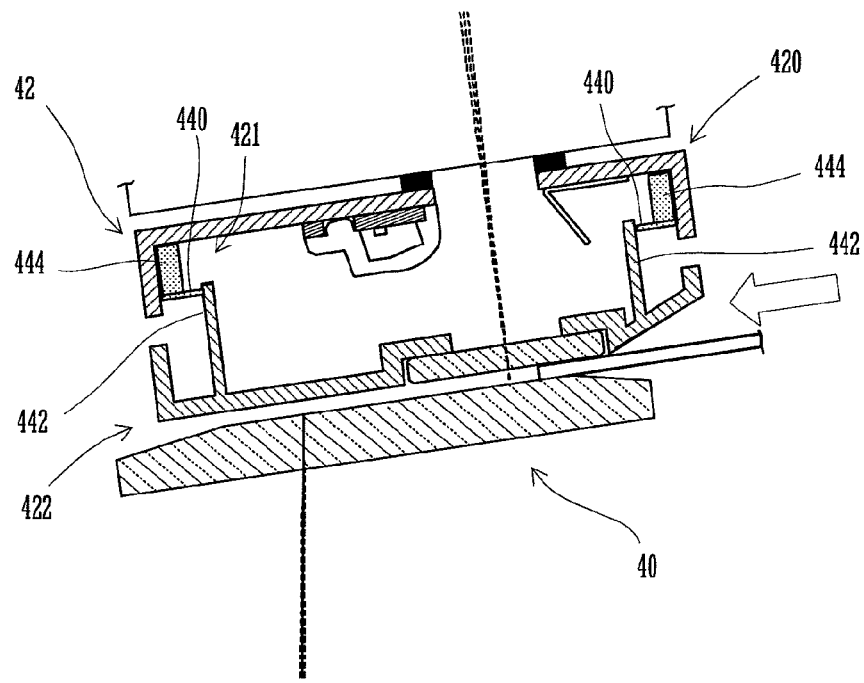
FIG. 9A and FIG. 9B illustrate an operation of the second read guide unit and a state of a sealing unit.
Figure 9B:
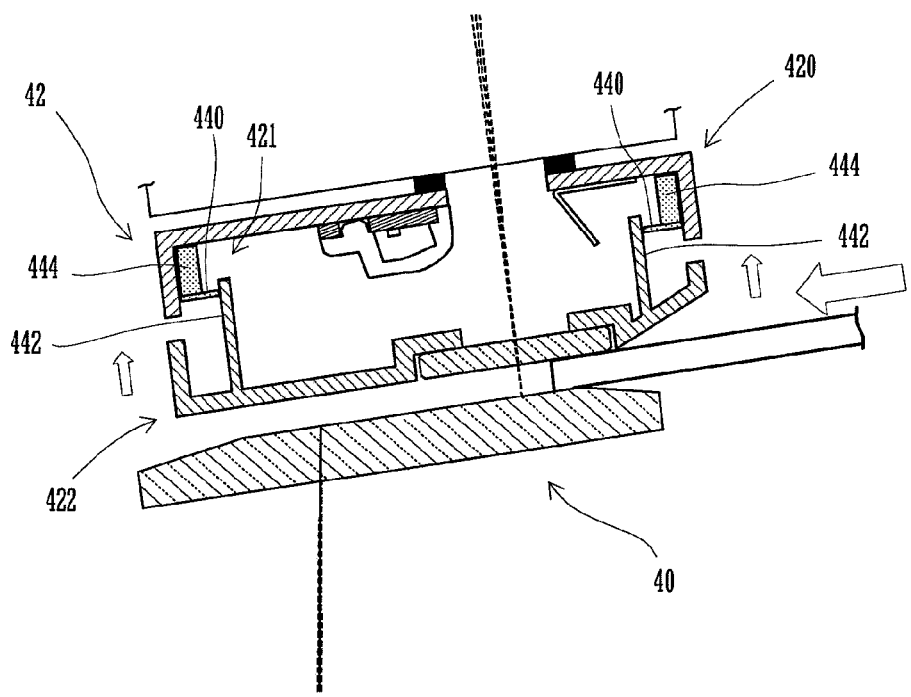

Referring next to FIGS. 9A and 9B, operations of the first read guide unit 40 and the second read guide unit 42 are described below. FIG. 9A illustrates a state of the first read guide unit 40 and the second read guide unit 42 when an ordinary paper document of about 0.1 to 0.2 mm in thickness is conveyed, and FIG. 9B illustrates a state of the first read guide unit 40 and the second read guide unit 42 when a card document of about 0.8 mm in thickness is conveyed.

As illustrated in FIG. 9A, when the surface and the rear face of a document are read simultaneously, the space between the first read guide unit 40 and the second read guide unit 42 is decreased to about 0.6 mm for a stable focal length. As a result, when an ordinary paper document of about 0.1 to 0.2 mm in thickness is conveyed, both images for the surface and the rear face of the document can have reduced tendency of defocusing.

As illustrated in FIG. 9B, when a document exceeding about 0.6 mm in thickness passes, the second read guide unit 42 is lifted upward by a force received from the document, and moves away from the document conveyance path 36. At this time, the boss 445 at one end portion of the read guide 422 moves upward while being guided by the shoulder screw 432, and the engagement piece 438 at the other end portion of the read guide 422 moves upward while being guided by the engagement hole 436, and accordingly the read guide 422 slides upward while keeping the parallel state. As a result, the space between the first read guide unit 40 and the second read guide unit 42 is expanded.

This embodiment is configured so that the space between the first read guide unit 40 and the second read guide unit 42 is expanded to about 1.3 mm at maximum. Therefore, even when a card-like document of about 0.8 mm in thickness is conveyed, for example, the document can be conveyed in a preferable manner and images on both faces can be read.

Additionally, the seal mechanism 421 sealing the read frame 420 and the read guide 422 can prevent dust from entering inside the read frame 420 and the read guide 422. Therefore, even when the read guide 422 moves upward, the seal mechanism 421 keeps the sealing property inside the read guide 422 and the read frame 420.

Further, when the read guide 422 moves downward, a bending force is slightly applied to the end of the dustproof sheet 440, and large friction does not occur between the dustproof sheet 440 and the rib 442. Accordingly, a dustproof effect can be obtained without inhibiting the vertical moving operation of the read guide 422.

Moreover, a focal length for an ordinary paper document having an ordinary thickness is secured, and further a focal length can be secured stably even when both faces of a thick document such as a card document are read. In this way, both faces of a document can be read simultaneously without defocusing irrespective of the thickness of a document.

A thick document such as a card document passes through a linear portion only in the document conveyance path 36 without passing through a curved portion in the document conveyance path 36 and is discharged to the second document output unit 30, and therefore a problem such as a conveyance failure can be suppressed.

The above described embodiments are to be considered in all respects as illustrative and not restrictive. The scope of the invention is indicated by the appended claims rather than by the foregoing description. All changes which come within the meaning and range of equivalency of the claims are intended to be embraced therein.

What is claimed is:

1. An image reader including a read guide disposed on both sides of a document conveyance path, the read guide having a space therein that is adjustable in accordance with a thickness of a document conveyed, comprising:
   a read frame member fixed to a document reading unit, the read frame member supporting an optical system;
   a read guide member making up a housing member together with the read frame member to accommodate the optical system therein, the read guide member being configured to guide a document to be conveyed to a reading position and support a read glass, and the read guide member being supported slidably with respect to the read frame member; and a seal mechanism covering a gap between the read frame member and the read guide member, wherein the seal mechanism includes a rib standing in parallel with a sliding direction of the read guide member and a flexible dustproof sheet having an end that is in contact with the rib.

2. The image reader according to claim 1, wherein the dustproof sheet of the seal mechanism is disposed to be in contact with the rib in a direction orthogonal to the rib.

3. The image reader according to claim 1, wherein the read guide member is supported with respect to the read frame member so as to move away from the document conveyance path in response to a force from a document conveyed.

4. The image reader according to claim 2, wherein the read guide member is supported with respect to the read frame member so as to move away from the document conveyance path in response to a force from a document conveyed.

5. The image reader according to claim 2, wherein the rib of the seal mechanism is disposed along an entire perimeter of the read guide member and the dustproof sheet of the seal mechanism is disposed along an entire perimeter of the read frame member.

6. The image reader according to claim 2, wherein the dustproof sheet comprises a urethane sheet, and is attached to the read frame member via a sheet attachment part made of urethane foam.

7. An image forming apparatus comprising the image reader according to claim 2.

* * * * *